(12) United States Patent
Hirukawa

(10) Patent No.: US 9,022,008 B2
(45) Date of Patent: May 5, 2015

(54) EVAPORATIVE EMISSIONS SYSTEM WITH CANISTER HAVING IMPROVED VENTING STRUCTURE, AND VEHICLE INCLUDING SAME

(75) Inventor: Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1084 days.

(21) Appl. No.: 13/050,334

(22) Filed: Mar. 17, 2011

(65) Prior Publication Data

US 2011/0239994 A1 Oct. 6, 2011

(30) Foreign Application Priority Data

Mar. 31, 2010 (JP) .................................. 2010-083176

(51) Int. Cl.
| | |
|---|---|
| *B60K 15/035* | (2006.01) |
| *B62J 35/00* | (2006.01) |
| *F02M 25/08* | (2006.01) |
| *B62K 5/01* | (2013.01) |
| *F02M 35/10* | (2006.01) |

(52) U.S. Cl.
CPC . *B62K 5/01* (2013.01); *B62J 35/00* (2013.01); *F02M 25/0872* (2013.01); *F02M 35/10222* (2013.01)

(58) Field of Classification Search
CPC ............ F02M 25/0872; F02M 25/089; F02M 35/10222
USPC ............ 123/519, 520, 521; 285/139.1, 139.3, 285/140.1, 921, 179, 180
See application file for complete search history.

(56) References Cited

U.S. PATENT DOCUMENTS

| | | | | |
|---|---|---|---|---|
| 5,692,637 A | * | 12/1997 | Hodge | ........................ 220/366.1 |
| 6,755,184 B2 | * | 6/2004 | Seskes | ........................ 123/519 |
| 6,769,415 B2 | * | 8/2004 | Reddy et al. | .................. 123/519 |
| 6,834,642 B2 | * | 12/2004 | Ichinohe | ....................... 123/518 |
| 7,717,476 B2 | | 5/2010 | Shida et al. | |

FOREIGN PATENT DOCUMENTS

| | | |
|---|---|---|
| JP | H02-64742 U | 5/1990 |
| JP | 2005-090327 A | 4/2005 |
| JP | 2008-240638 A | 10/2008 |
| JP | 2009-068350 A | 4/2009 |

OTHER PUBLICATIONS

Machine Traslation of JP2009068350A of pto-892.*

* cited by examiner

*Primary Examiner* — Hieu T Vo
*Assistant Examiner* — Arnold Castro
(74) *Attorney, Agent, or Firm* — Carrier Blackman & Associates, P.C.; Joseph P. Carrier; Anne G. Sabourin

(57) ABSTRACT

A vehicle includes a fuel tank, a canister for temporarily storing vaporized fuel from the fuel tank, a charge pipe that connects the fuel tank and the canister and that introduces vaporized fuel from the fuel tank to the canister, a purge pipe that connects the canister with an intake system of an internal combustion engine, and a vent pipe that connects the canister with ambient air outside of the canister. An opening of the vent pipe is arranged to open upwardly with respect to the vehicle body in a recessed portion that is formed in a hollow shape and opens downwardly in the vehicle body. A space is formed to partially open in an interval to a recessed portion sidewall of the recessed portion, and a locking member is also provided to cover the opening of the recessed portion from below.

10 Claims, 13 Drawing Sheets

EVAPORATIVE EMISSIONS SYSTEM WITH CANISTER HAVING IMPROVED VENTING STRUCTURE, AND VEHICLE INCLUDING SAME

CROSS-REFERENCE TO RELATED APPLICATIONS

The present invention claims priority under 35 USC 119 based on Japanese patent application No. 2010-083176, filed on Mar. 31, 2010. The subject matter of this priority document is incorporated by reference herein.

BACKGROUND OF THE INVENTION

1. Field of the Invention

The present invention relates to a vehicle, and in particular to a vehicle adapted for rough terrain running, the vehicle including improved terminal structure of a vent pipe connected to an evaporative emissions canister of the vehicle.

2. Background Art

An evaporative emissions canister (also called "charcoal canister") of a vehicle that is driven by an internal combustion engine is an apparatus that is interposed between a fuel tank and an engine, and has the function of temporarily storing vaporized fuel from the fuel tank, and supplying the vaporized fuel to the engine when engine operation is commenced.

Activated carbon or the like is packed into an inner portion of the apparatus to absorb the vaporized fuel. A method of supplying the vaporized fuel to the engine uses the negative pressure (vacuum) present in the engine's intake system after startup, aspirates air from the outside through the vent pipe that is provided on the canister side with that negative pressure, and separates the vaporized fuel for supply to the engine. Normally, the distal end opening of the vent pipe opens in an area below the vehicle frame, as disclosed in published Japanese Patent document JP-A 2005-90327. The vent pipe of this reference opens downwardly in order to inhibit entry of water into the canister, in the event that the canister is exposed to water during vehicle operation.

In contrast to a general passenger vehicle, since an all-terrain vehicle may be driven through water, the vent pipe of a canister in a vehicle that is adapted for rough terrain traveling is configured to open in the pipe-structure vehicle body frame to thereby increase a water preventative effect.

However the vehicle body frame is not a tightly sealed structure, and during operation in water, there is a real possibility of water entering the canister via the vent pipe.

Further, when piping is provided in a specific position in the vehicle body frame in order to prevent entry of water, the length of the vent pipe will increase. Also, when the vent pipe length increases, the problem arises that additional structure is required for fixing or layout of the vent pipe.

The present invention is proposed in light of the above problems, and has the object of providing a vehicle that reduces the length of the vent pipe in an all-terrain vehicle, and includes a structure that effectively enables suppression of water entry from the vent pipe.

SUMMARY OF THE INVENTION

In order to achieve the above object, the present invention according to a first aspect hereof includes a vehicle body frame configuring a vehicle body, a fuel tank that stores fuel and is mounted on the vehicle body frame, a canister that temporarily stores vaporized fuel from the fuel tank, a charge pipe that connects the fuel tank and the canister and that introduces vaporized fuel from the fuel tank to the canister, a purge pipe that connects the canister with an intake system of an internal combustion engine, a vent pipe that connects the canister with the outside air, and a vehicle body cover for covering the vehicle. The invention is characterized in that an opening of the vent pipe is retained to open upwardly with respect to the vehicle body in a recessed portion that is formed in a bottomed cylindrical shape, provided on the vehicle cover and has a downward open portion oriented downwardly in the vehicle.

In addition to the configuration according to the first aspect, the present invention according to a second aspect hereof is characterized in that a partially open space is formed in an interval to a recessed portion sidewall of the portion, and a locking member is provided to cover the downward opening from below the vehicle body.

In addition to the configuration according to the first or second aspect, the present invention according to a third aspect hereof is characterized in that the locking member includes: a plate-shaped portion that is opposed to a ceiling surface of the recessed portion; a sidewall portion that extends from an edge portion of the plate-shaped portion along the recessed portion sidewall of the recessed portion; and a locking pawl that is provided on the sidewall portion and that engages with the locking portion provided in the recessed portion.

In addition to the configuration as stated in any one of the first through third aspects hereof, the present invention according to a fourth aspect hereof is characterized in that the locking member includes a sidewall extension portion integrated on the sidewall portion, a pipe-supporting portion that supports the vent pipe with a locking member guiding portion, and a cylindrical portion that protrudes towards the ceiling surface of the recessed portion at the plate-shaped portion, is fitted with a distal portion of the vent pipe, and includes a positioning pawl for positioning and locking the vent pipe.

In addition to the configuration as stated in any one of the first through fourth aspects hereof, the present invention according to a fifth aspect hereof is characterized in that the recessed portion is configured such that a horizontal wall of a rear surface of a carrier plate uses as the ceiling surface, and the reinforcing rib of the rear surface uses as the recessed portion sidewall, and the locking member is fitted and locked to the recessed portion.

In addition to the configuration as stated in any one of the first through fifth aspects hereof, the present invention according to a sixth aspect hereof is characterized in that the space is disposed in a position that overlaps rearwardly with respect to the canister when the vehicle is viewed from the front.

In addition to the configuration as stated in the sixth aspect hereof, the present invention according to a seventh aspect hereof is characterized in that a position of the carrier plate is configured so that a carrier upper surface is positioned above a rearward extension line or on the rearward extension line of a riding seat.

Advantageous Effects of Invention

According to the present invention according to the first aspect hereof, when the all-terrain vehicle is operating in water, even when the water surface rises, air becomes enclosed in the recessed portion, and therefore rapid entry of water into the vent pipe is suppressed. Furthermore, since even when air becomes aspirated, the space is adapted to be small and creates flow resistance. Therefore water entry can be suppressed. Since the vent pipe is supported and extends upwardly, the height to the opening of the vent pipe in the recessed portion can be maintained, and water entry can be suppressed.

In addition to the configuration of the first aspect hereof, the present invention according to the second aspect is configured with a locking member that covers the downward opening from below the vehicle so that a space is formed that is partially opened in the interval to the recessed sidewall of the recessed portion. Therefore water entry into the vent pipe is effectively suppressed by the main body of the locking member and the passage of air is ensured by the space.

According to the third aspect hereof, the locking member is configured with a locking pawl that engages with the locking portion provided in the recessed portion, and therefore a simple structure is enabled, and moreover simple assembly is possible by merely pressing the locking member into the recessed portion.

According to the present invention in the fourth aspect hereof 4, the vent pipe is guided and retained in the locking member in the pipe-supporting portion. The distal portion of the vent pipe is connected to a predetermined position facing upwardly in an inner upper portion of the recessed portion.

According to the present invention in the fifth aspect hereof, the recessed portion is configured to use a reinforcing rib and the ceiling surface of the rear surface of the carrier plate. Therefore a conventional vehicle structure can be used to form an effective water prevention structure.

According to the present invention in the sixth aspect hereof, the space is disposed in a position that overlaps at a rear position with respect to the canister when the vehicle is viewed from the front. Therefore when running in water, water entry from the space can be suppressed since the canister plays a water isolating role.

According to the present invention in the seventh aspect hereof, the position on the carrier upper face of the carrier plate is positioned on the rear extension line or above the rear extension line of the riding seat, and therefore the state in which the water level rises up to the height of the riding seat substantially coincides with the water level region that causes an alert for a passenger. Furthermore the frequency with which the water level rises to the opening of the vent pipe provided on a lower portion of the carrier plate can be reduced.

DETAILED DESCRIPTION OF ILLUSTRATIVE EMBODIMENTS

Figure 1:
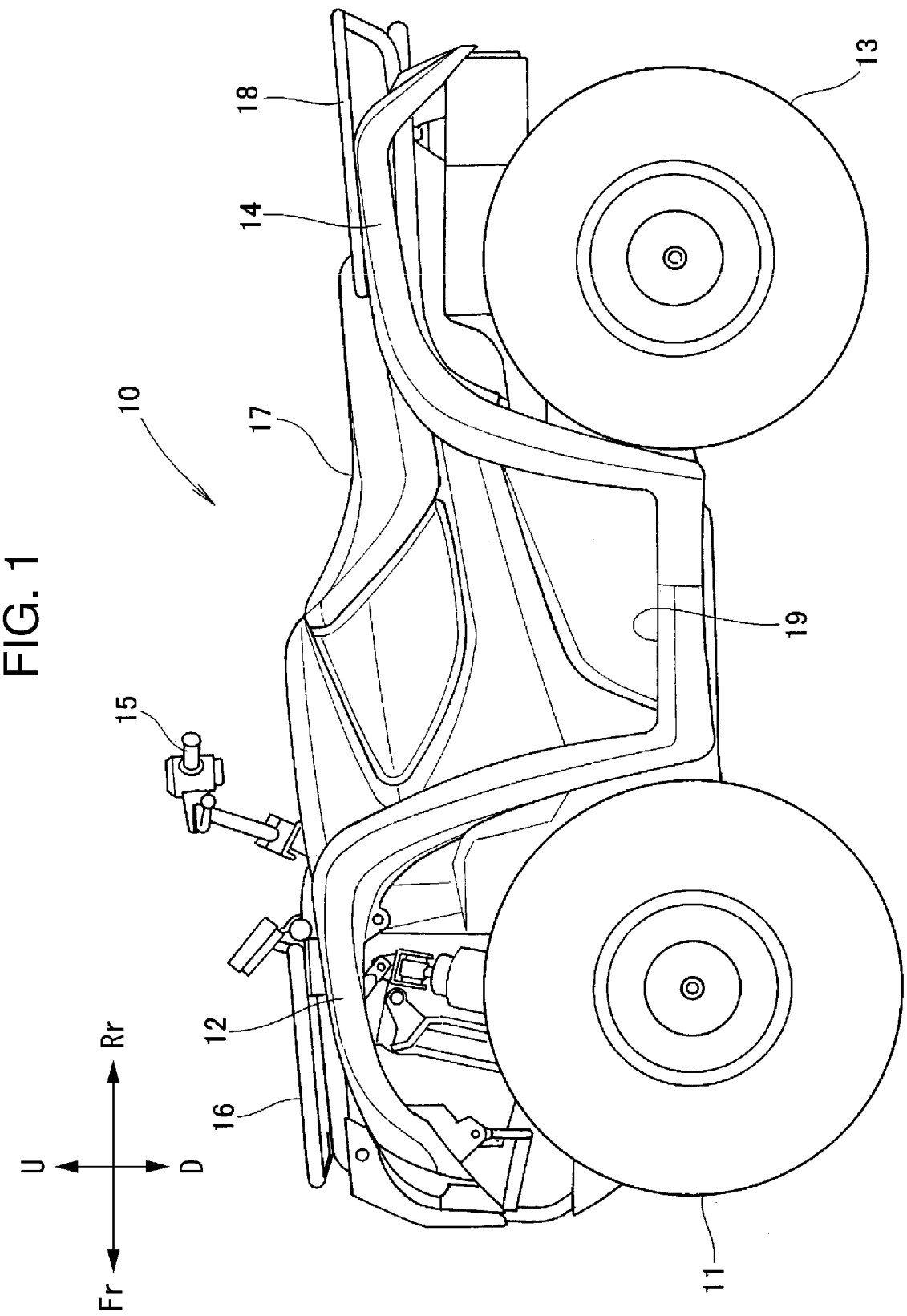
FIG. 1 is a left-side plan view of a vehicle according to the present invention.

The embodiments of the present invention will be described below with reference to the attached drawings. The drawings should be viewed in the direction of the reference signs. In the following description, front and back, left and right, upper and lower are seen according to the direction of viewing from the rider. In the drawings, the front direction of the vehicle is denoted as FR, the rear direction is denoted as RR, the left is denoted as L, the right is denoted as R, upwards is denoted as U, and downwards is denoted as D.

Figure 7:
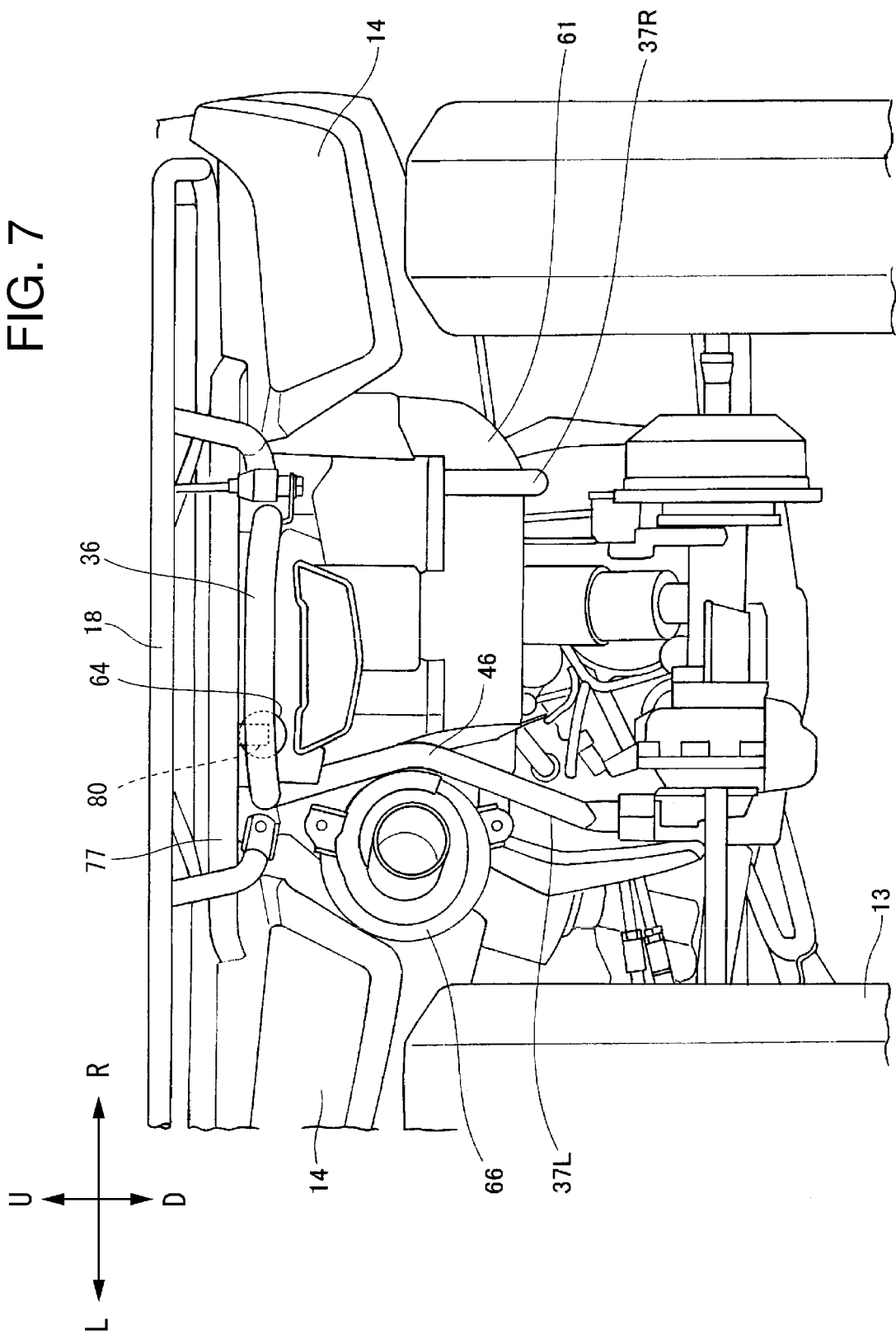
FIG. 7 is a rear view of a vehicle according to the present invention.
Figure 11:
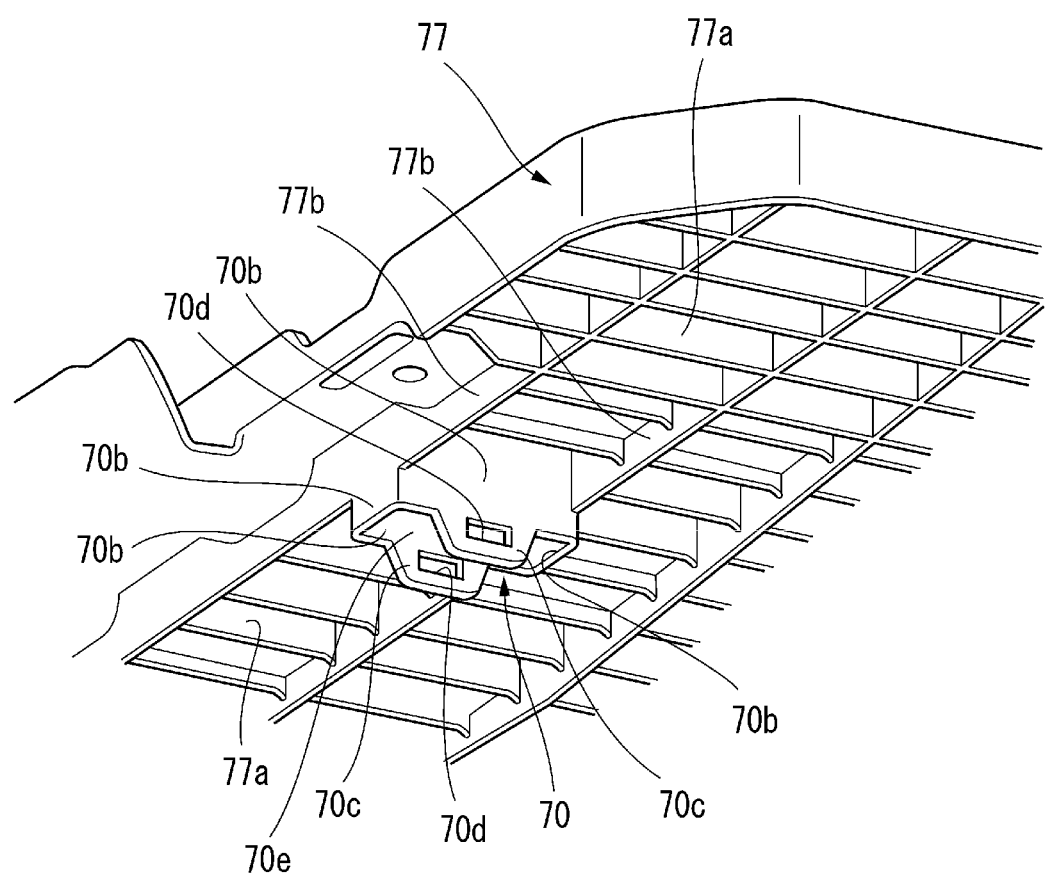
FIG. 11 is a partial perspective view seen from the rear side of the carrier plate according to the present invention.

As shown in FIG. 1, the vehicle 10 is a small vehicle that includes a front wheel 11 on a front lower portion of the vehicle body, a front fender 12 above the front wheel 11, a rear wheel 13 on a rear lower portion of the vehicle body, a rear fender 14 above the rear wheel 13, a steering handlebar 15 above the front wheel 11, a front carrier (luggage rack) 16 in front of the steering handlebar 15, and a riding seat 17 and a rear carrier (luggage rack) 18 disposed behind the steering handlebar 15. The rear carrier 18 has a substantially grid-shaped carrier plate 77 disposed therebelow, as shown in FIGS. 2, 7 and 11.

Figure 2:
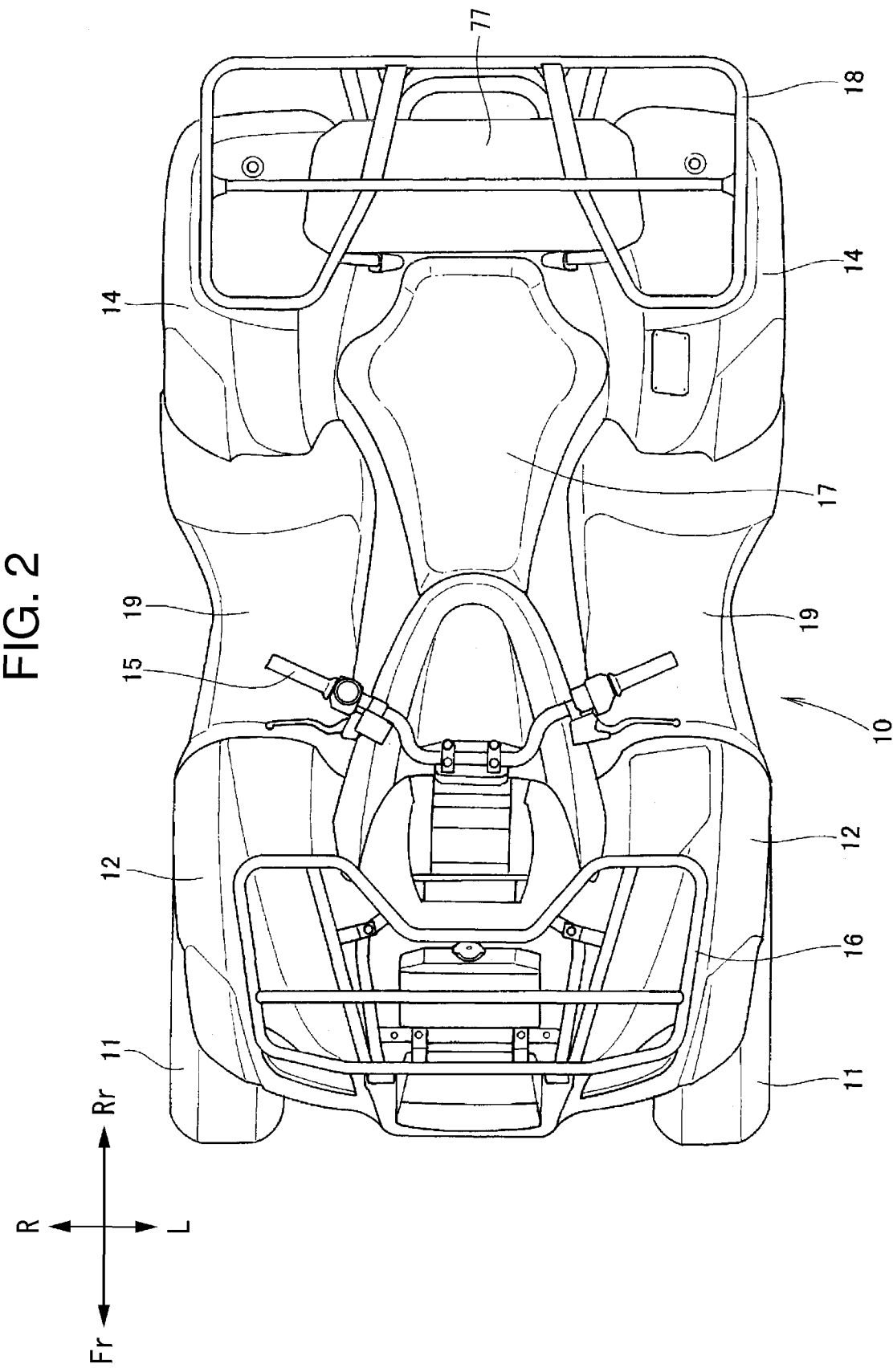
FIG. 2 is a plan view of the vehicle according to the present invention.

The vehicle 10 as shown in FIG. 2 is a saddle-ride type all-terrain vehicle that includes right and left step floors 19, 19 between the steering handlebar 15 and the riding seat 17, and is adapted so that the feet of an occupant when seated on the riding seat 17 can be mounted on the step floors 19, 19.

The vehicle body cover for example enables raising of the front fender 2, the rear fender 14, the front carrier 16, the riding seat 17, the rear carrier 18, the step floor 19, the auxiliary equipment cover, and the like. The vehicle body cover in the present invention is not limited to a structural component in order to simply cover the vehicle body, and is widely defined to mean a vehicle body structural body that includes a member that retains auxiliary equipment or the auxiliary equipment itself.

The structure of the vehicle body frame of this type of vehicle 10 will be described below.

Figure 3:
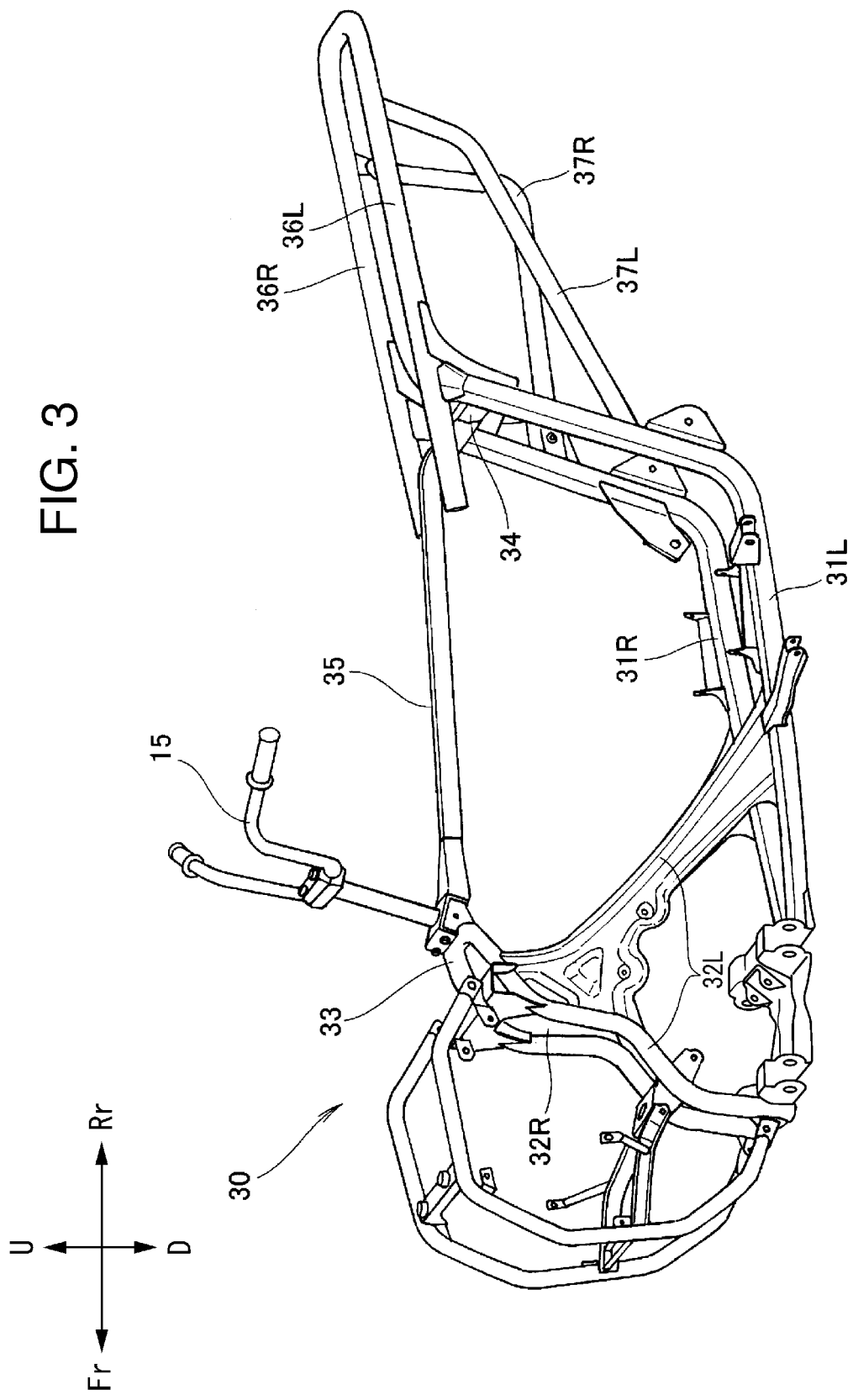
FIG. 3 is a perspective view of the vehicle body frame.

As shown in FIG. 3, the vehicle body frame 30 is composed of a right and left pair of main frames 31R, 31L extending along a longitudinal vehicle direction and having a rear portion bent upwardly (the suffix L denotes left seen from the passenger and R that similarly denotes right. The same comments apply hereafter), a right and left front wheel suspension supporting portion 32R, 32L that is configured by a pipe or a frame extending upwardly from a front portion of the main frame 31L, 31R and that supports the front wheel suspension apparatus, a first crossmember 33 that crosses from the left front wheel suspension supporting portion 32L in a transverse vehicle direction to the right front wheel suspension supporting portion 32R, a second crossmember 34 that crosses from the rear portion of the left main frame 31L in a transverse vehicle direction to the rear portion of the right main frame 31R, an upper tension pipe 35 having a front end thereof mounted detachably on the first crossmember 33, and a rear end thereof mounted detachably on the second crossmember 34, a right and left pair of rear pipes 36L, 36R extending from a rear upper portion of the main frame 31L, 31R in a vehicle rear direction, one rear sub-pipe 37L that extends from a rear intermediate portion of one main frame 31L and inclines to one rear pipe 36L, and one rear sub-pipe 37R that extends from a rear intermediate portion of the other main frame 31R and inclines to one rear pipe 36R. The rear sub-pipes 37L, 37R are configured reinforcing stays that reinforce the rear pipes 36L, 36R.

One rear sub-pipe 37L is fixed by welding to the one main frame 31L and the one rear pipe 36L.

Figure 4:
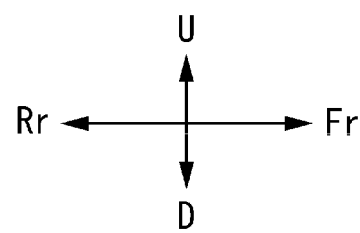
FIG. 4 is a perspective view showing the rear portion of the vehicle body frame.
Figure 4:
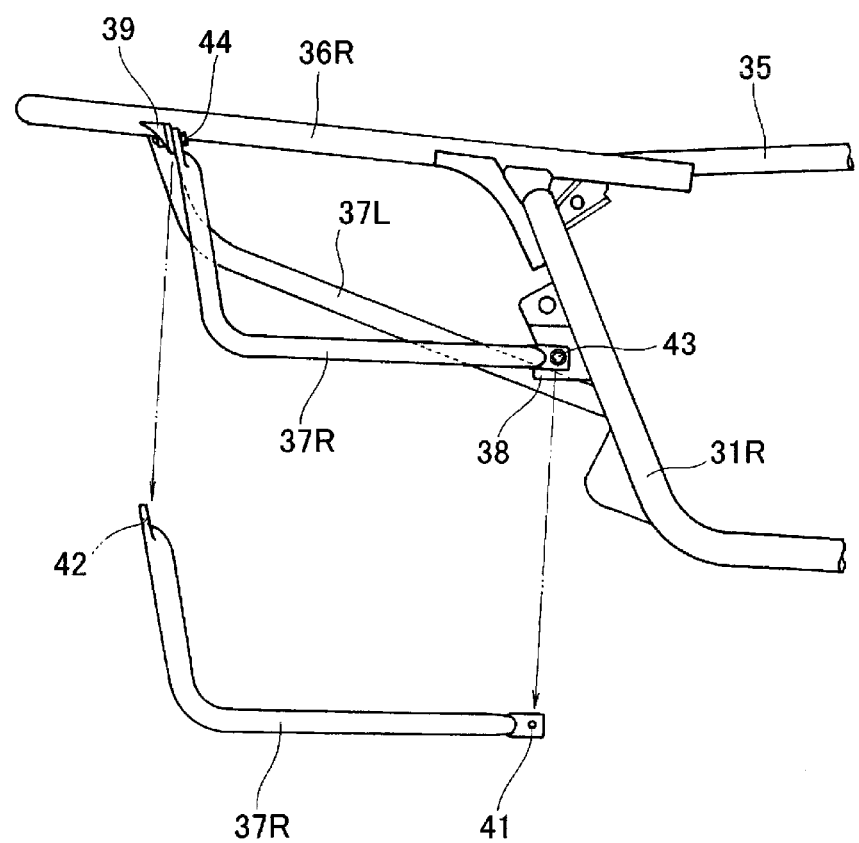

The other rear sub-pipe 37R as shown in FIG. 4 is detachably fastened to the other main frame 31R and the rear pipe 36R.

As a result, for example, the front stay 38 extends from an intermediate portion of the other main frame 31R to the rear vehicle direction. The surface of the front stay 38 is a plate that can be seen from the side of the vehicle. The rear stay 39 extends from the rear portion of the other rear sub-pipe 37R downwardly. The surface of the rear stay 39 is a plate that can be seen from the front of the vehicle.

The other rear sub-pipe 37R that is formed in the shape of a letter L and is a member that includes a bolt hole 41 that passes in a transverse vehicle direction into the front end portion of the pipe member, and a bolt hole 42 that passes in a longitudinal vehicle direction to the rear end portion of the pipe member. The other rear sub-pipe 37R is mounted detachably on the other main frame 31R and the other rear pipe 36R by inserting the bolts 43, 44 into the bolt holes 41, 42.

When the front end of the rear sub-pipe 37R abuts on the face of the front stay 38, if an external force in the transverse vehicle direction is applied to the rear sub-pipe 37R, the external force is effectively supported by the face of the front stay 38.

Furthermore when the rear end of the rear sub-pipe 37R abuts on the front face of the rear stay 39, if an external force operates in the rear vehicle direction to the rear sub-pipe 37R, the external force is effectively supported by the front face of the rear stay 39.

Next, supplementary description will be given regarding the shape of the rear sub-pipes 37L, 37R based on FIG. 5.

Figure 5:
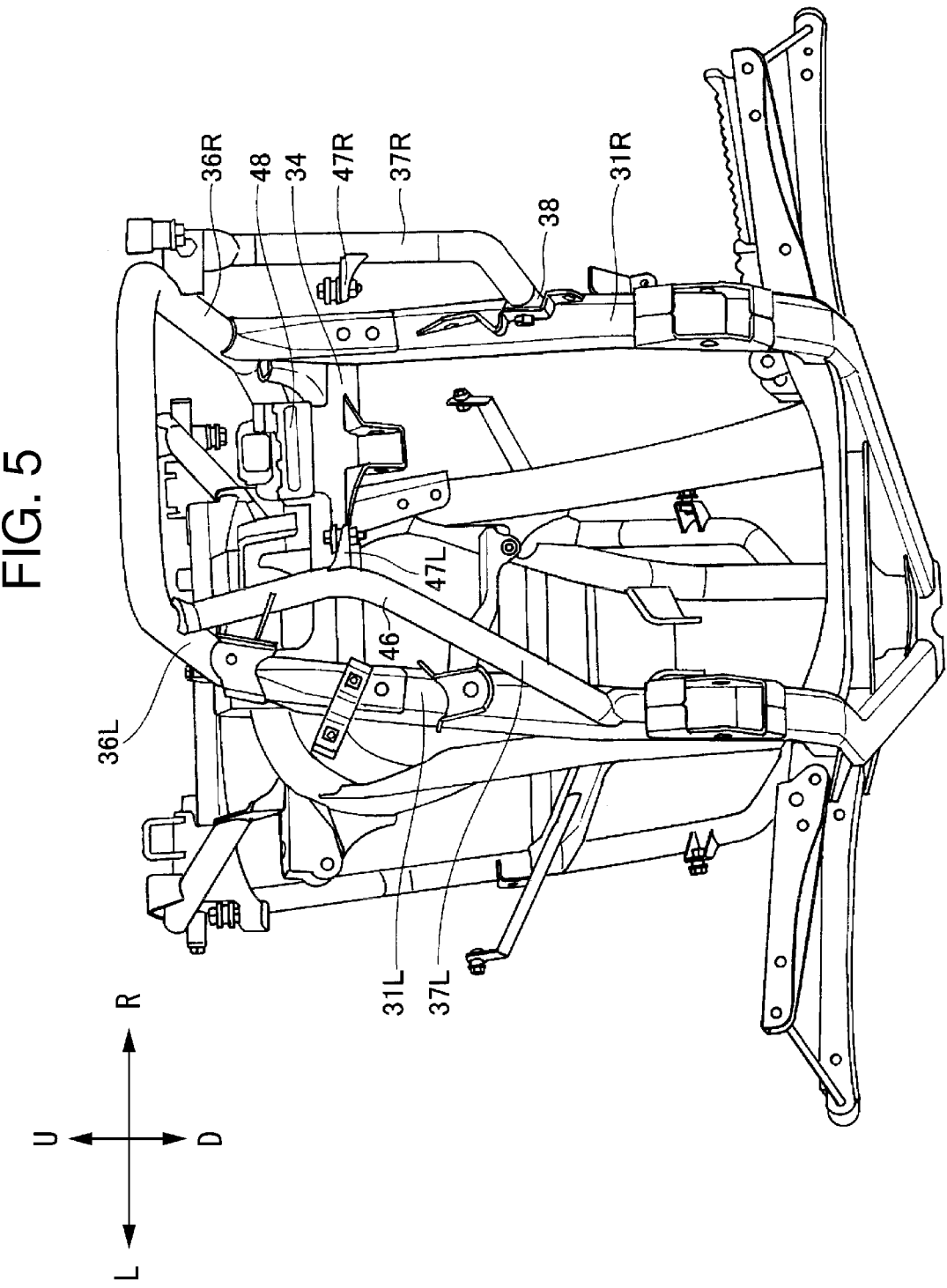
FIG. 5 is a rear perspective view of the vehicle body frame.

As shown in FIG. 5, the trailing portion of the right rear sub-pipe 37R descends substantially in parallel with the main pipe 31R.

On the other hand, the left rear sub-pipe 37L is formed with a curvature to project to an inner side in a transverse vehicle direction (vehicle width center). The left auxiliary equipment supporting bracket 47L is provided on the curved portion 46 so that at least one projects to an inner side in a transverse vehicle direction.

The right auxiliary equipment supporting portion 47R that corresponds to the left auxiliary equipment supporting bracket 47L is provided on the right rear sub-pipe 37R.

A tank-supporting hole 48 is provided on the crossmember (second crossmember 34) that crosses from the rear portion of the left main frame 31L to the rear portion of the right main frame 31R. The tank-supporting hole 48 opens to the rearward vehicle direction.

Next the auxiliary equipment will be described.

In the present embodiment, although an example of the fuel tank 50 and peripheral equipment therefor will be described, the auxiliary equipment is not limited by type as long as it is large vehicle-mounted components such as an air cleaner, a battery, electrical-mounted components, or the like.

Figure 6:
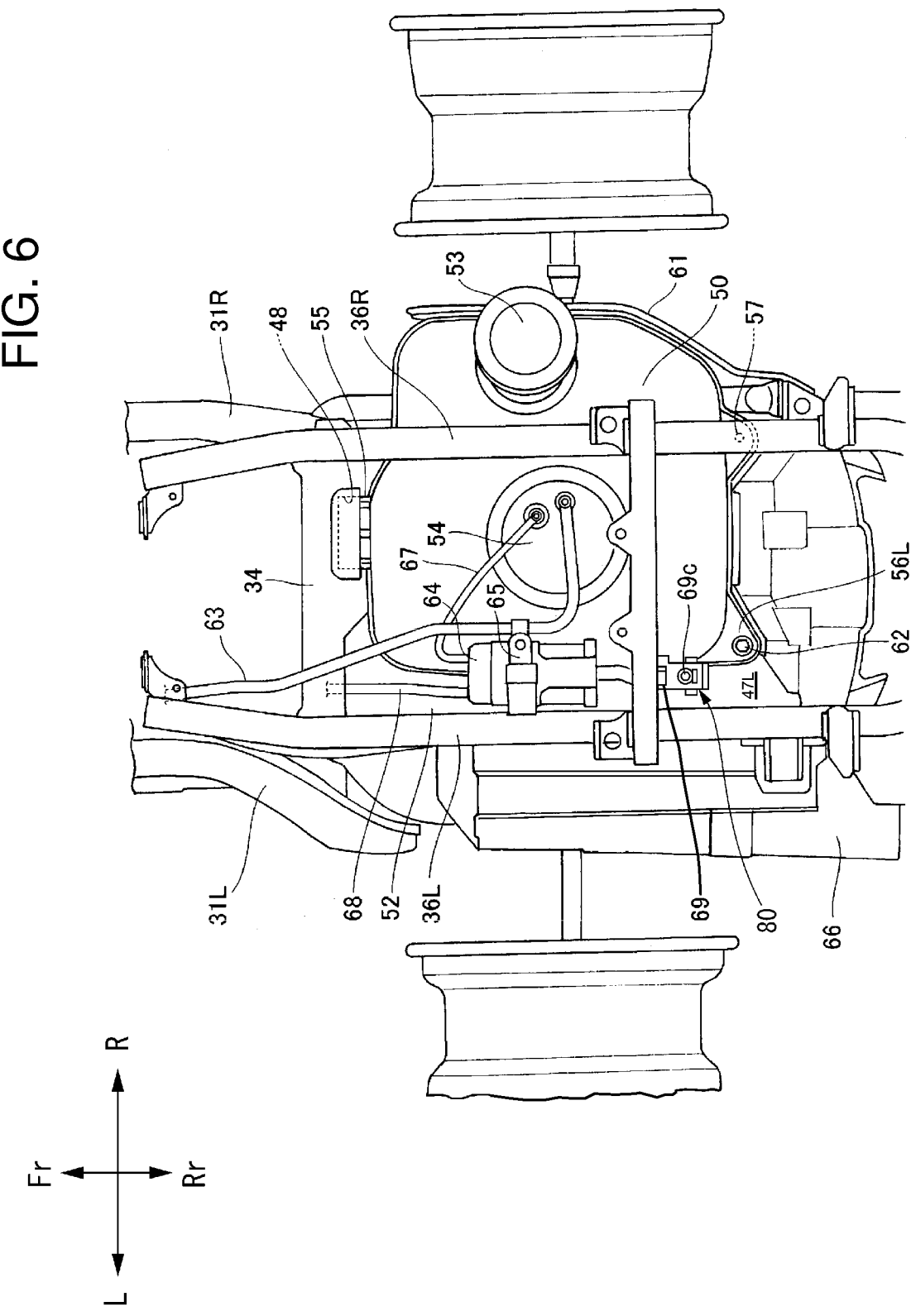
FIG. 6 is a plan view of the state in which the carrier plate that mounts a locking member according to the present invention is removed.

As shown in FIG. 6, a first auxiliary equipment cover 52 that covers the left surface 51 of the fuel tank 50 is mounted on one rear sub-pipe 37L.

The fuel tank 50 is a flat substantially rectangular container provided with a fuel cap 53 and a fuel pump 54. The front surface of the fuel tank 50 is provided with a protruding boss 55 that extends towards the front of the vehicle, and the rear surface is provided with a right flange 56R and a left flange 56L.

This type of fuel tank 50 is pre-mounted onto the rear sub-pipe 37R by fastening the right flange 56R and the right auxiliary equipment supporting portion 47R (refer to FIG. 5) with a bolt 57.

At the same time, a second auxiliary equipment cover 61 that covers the right surface 58, the bottom surface and the rear surface 59 of the fuel tank 50 is pre-mounted on the other rear sub-pipe 37R.

Next, as shown in FIG. 6, the protruding boss 55 of the fuel tank 50 is inserted into the vehicle-side tank-supporting hole 48. The left flange 56L is mounted on the left auxiliary equipment supporting bracket 47L (refer to FIG. 5), the bolt 62 is inserted from above and fastened. Then, the fuel tank 50 is fixed to the vehicle at a total of three positions being one front position and two rear positions.

As a result, the first auxiliary equipment cover 52 is integrated with the second auxiliary equipment cover 61 to thereby complete one auxiliary equipment cover. This auxiliary equipment cover is used to cover the bottom surface, the rear surface, the left surface, and the right surface of the fuel tank 50.

The canister 64 that collects vaporized fuel produced by the fuel tank 50 is mounted on the one rear pipe 36L by a stay 65 more towards the vehicle center than the first auxiliary equipment cover 52. The vaporized fuel produced by the fuel tank 50 extends from the fuel tank 50 and is collected in the canister 64 by a charge pipe 67 that is connected to a front portion of the canister 64. Vaporized fuel is suitably conveyed to the intake system of the engine through the purge pipe 68 that extends from the front portion of the canister 64 towards the front of the vehicle.

A vent pipe 69, which extends from the rear surface of the canister 64 and opens to the atmosphere, and the supporting structure of the vent pipe 69 will be described below.

A fuel supply pipe 63 passes from the fuel pump 54 in the right transverse vehicle direction of the canister 64 and through the right transverse vehicle direction of the left rear pipe 36L towards the engine.

As shown in FIG. 4, since the rear sub-pipe 37R is easily removable from the main frame 31R and the rear pipe 36R, large auxiliary equipment such as the fuel tank 50 can be inserted below the rear pipe 36R.

As shown by FIG. 5, the one rear sub-pipe 37L is provided with at least one auxiliary equipment supporting bracket 47L, that is formed with a curvature towards an inner side in a transverse vehicle direction so that the curved portion 46 is positioned more towards the center of the vehicle than the one rear pipe 37L when the vehicle is viewed in plan view, and supports auxiliary equipment on the curved portion 46.

The one rear sub-pipe 37L is formed with a curvature so that the curved portion 46 is positioned more towards the center of the vehicle than other parts of the one rear sub-pipe 37L. As a result, as shown in FIG. 6, when seen in plan view, visual confirmation of the one rear sub-pipe 37L is possible without an impediment from the one upper rear pipe 36L. Since the auxiliary equipment supporting bracket 47L is provided on the one rear sub-pipe 37L, as shown in FIG. 6, the bolt 62 can be inserted and fastened from above into the auxiliary equipment supporting bracket 47L.

As shown by FIG. 4, a first auxiliary equipment cover 52 that covers one side face of the auxiliary equipment is mounted on the one rear sub-pipe 37L, and a second auxiliary equipment cover 61 that covers at least two of the other side face, bottom face and rear face of the auxiliary equipment is mounted on the other rear sub-pipe 37R. The first auxiliary equipment cover 52 is integrated with the second auxiliary equipment cover 61 in order to cover the auxiliary equipment.

Since the auxiliary equipment is pre-mounted on the other rear sub-pipe 37R, and the second auxiliary equipment cover 61 is pre-mounted, mounting of the auxiliary equipment cover can be completed by merely mounting the other rear sub-pipe 37R on the main frame and the rear pipe.

As shown in FIG. 6, a tank-supporting hole 48 is provided that is crossed by the second crossmember 34 that extends in a transverse vehicle direction from the rear portion of the left main frame 31L to a rear portion of the right main frame 31R, and supports the front portion of the fuel tank 50 on the second crossmember 34. Therefore the protruding boss 55, that extends toward the front of the vehicle from the fuel tank 50, can be fitted into the tank-supporting hole 48.

The front portion of the fuel tank 50 can be simply fixed to the vehicle body by merely fitting the protruding boss 55 into the vehicle-body tank-supporting hole 48.

As shown in FIG. 7, an exhaust pipe extending in a longitudinal vehicle direction or a silencing apparatus 66 connected to the exhaust pipe is disposed on an outer transverse vehicle direction of the curved portion 46.

Therefore an increase in the vehicle width can be suppressed, since the exhaust pipe or the silencing apparatus 66 is disposed on an outer side of the vehicle transverse direction of the curved portion 46 that curves inwardly in a transverse vehicle direction.

As shown in FIG. 6, the canister 64 is mounted on the one rear pipe 36L more towards the vehicle center than the first auxiliary equipment cover 52.

Since the canister 64 is mounted on the one rear pipe 36L, when the one rear sub-pipe 37R is removed together with the auxiliary equipment, there is no risk that the canister 64 will be removed. In addition, since the canister 64 is covered by the first auxiliary equipment cover 52, there is no risk of difficulty associated with removal or erroneous removal.

It is expected that warming of the canister 64, using the heat of the exhaust pipe or the silencing apparatus 66, will increase the purging efficiency of the canister 64.

Next, the structure of the locking member 80 that retains the vent pipe 69 connected with the canister 64, and the mounting structure thereof will be described.

Figure 12:
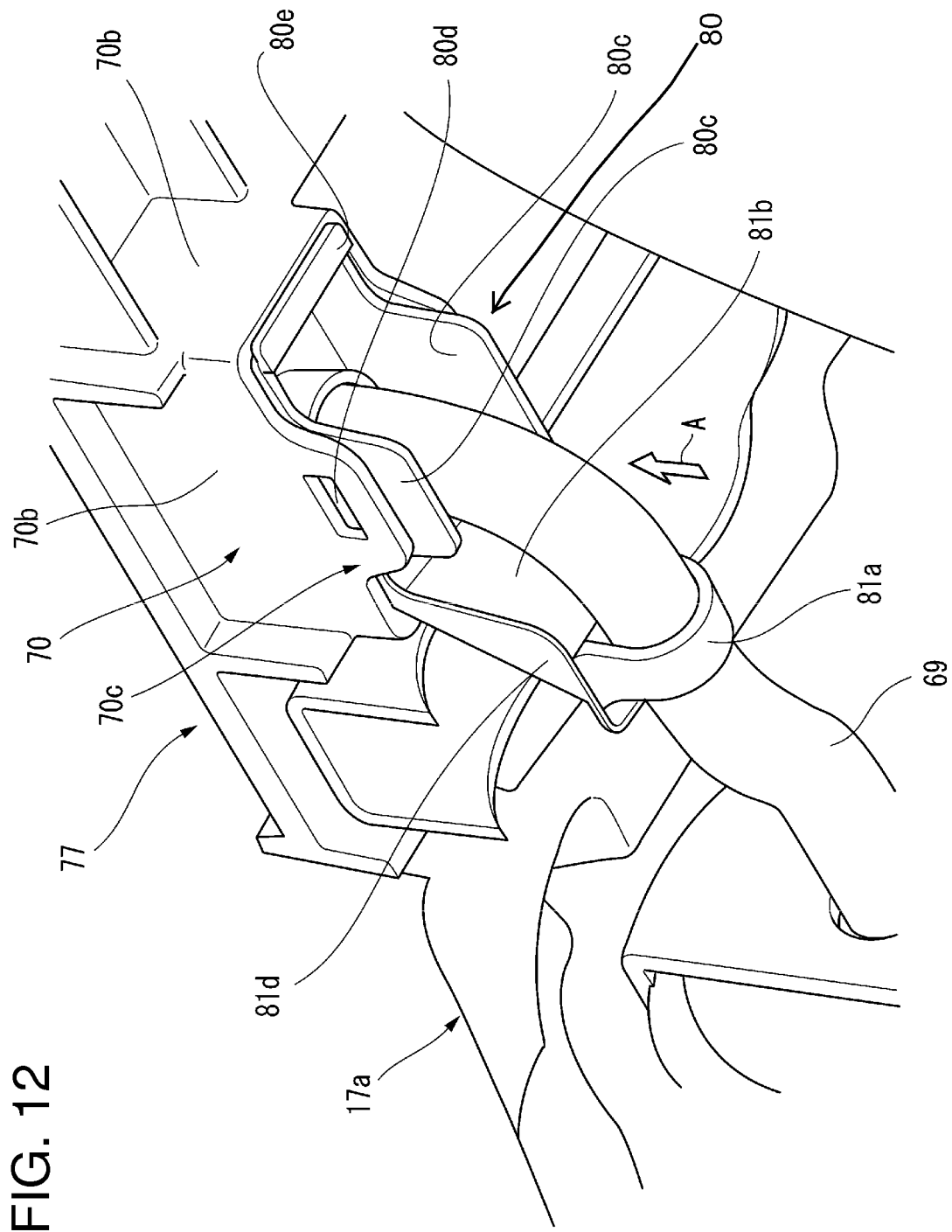
FIG. 12 is a schematic perspective view showing the mounted state of the locking member according to the present invention.
Figure 13:
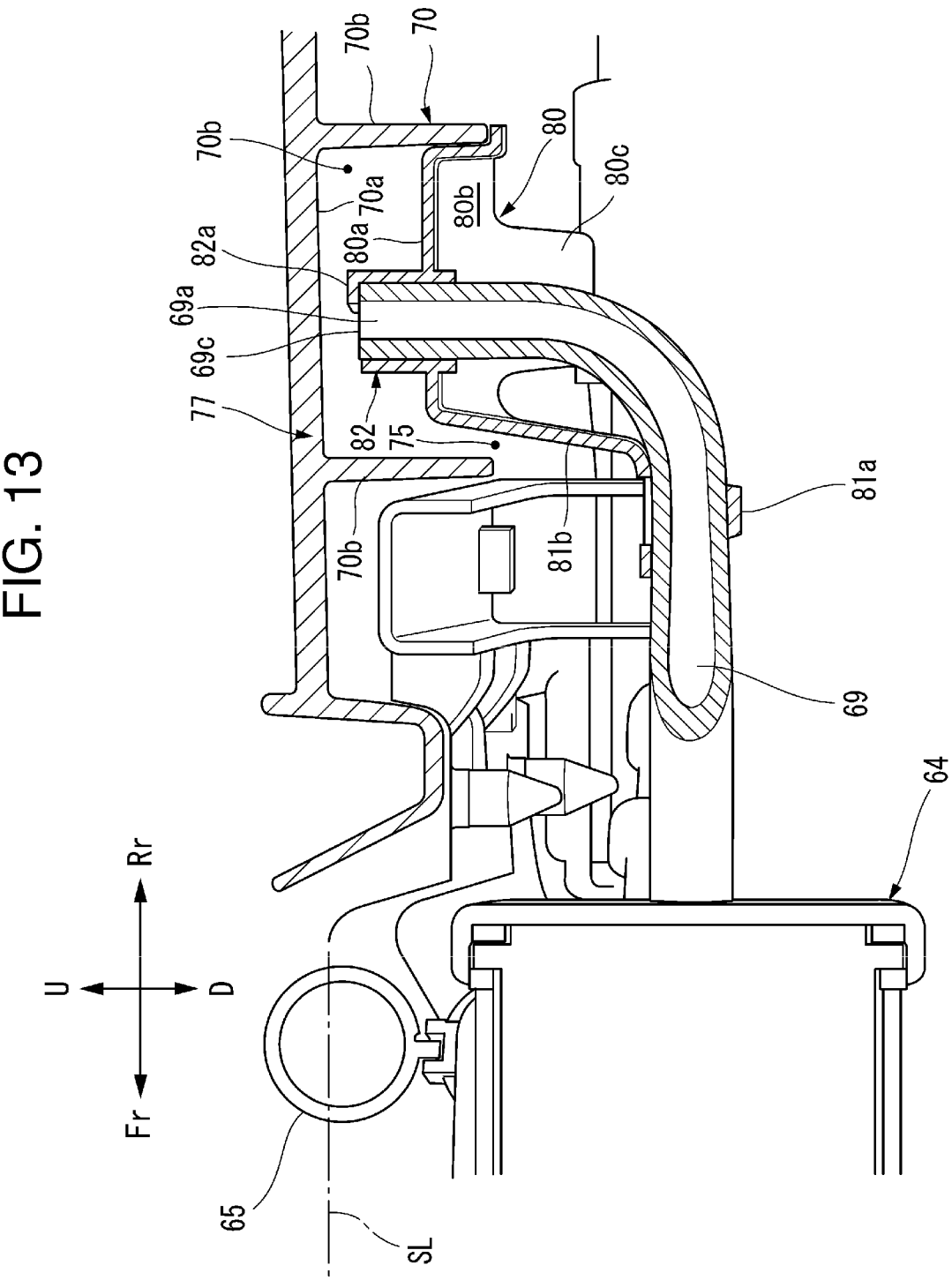
FIG. 13 is an exploded schematic side view of a portion showing an internal structure when the locking member according to the present invention is mounted.

The locking member 80 is disposed at a position immediately behind the canister 64 as shown in FIG. 7, FIG. 12 and FIG. 13.

In the present embodiment, the mounting position as shown in FIG. 11 is formed in a rear portion of the carrier plate 77, which functions as a vent pipe retaining member. The rear side of the carrier plate 77 has a structure in which the locking member 80 is fitted and locked to the recessed portion 70 that is configured using a horizontal wall of a rear portion of the carrier plate 77 as a ceiling surface 70a, using the reinforcing ribs 77a, 77b of the rear surface as the sidewalls 70b of the recessed portion, and orienting the opening 70e of the recessed portion 70 facing downwardly in the vehicle.

In other words, the locking member 80 is fixed and retained so that the vent pipe 69, and the opening 69a thereof are oriented upwardly on the vehicle body in the recessed portion 70. A space 75 is formed to partially open in the interval to the recessed portion sidewall 70b of the recessed portion 70, and the locking member 80 is mounted on the rear surface of the carrier plate 77, so that the downward opening 70e of the recessed portion 70 is covered from an area below the carrier plate 77 by the locking member.

Figure 8:
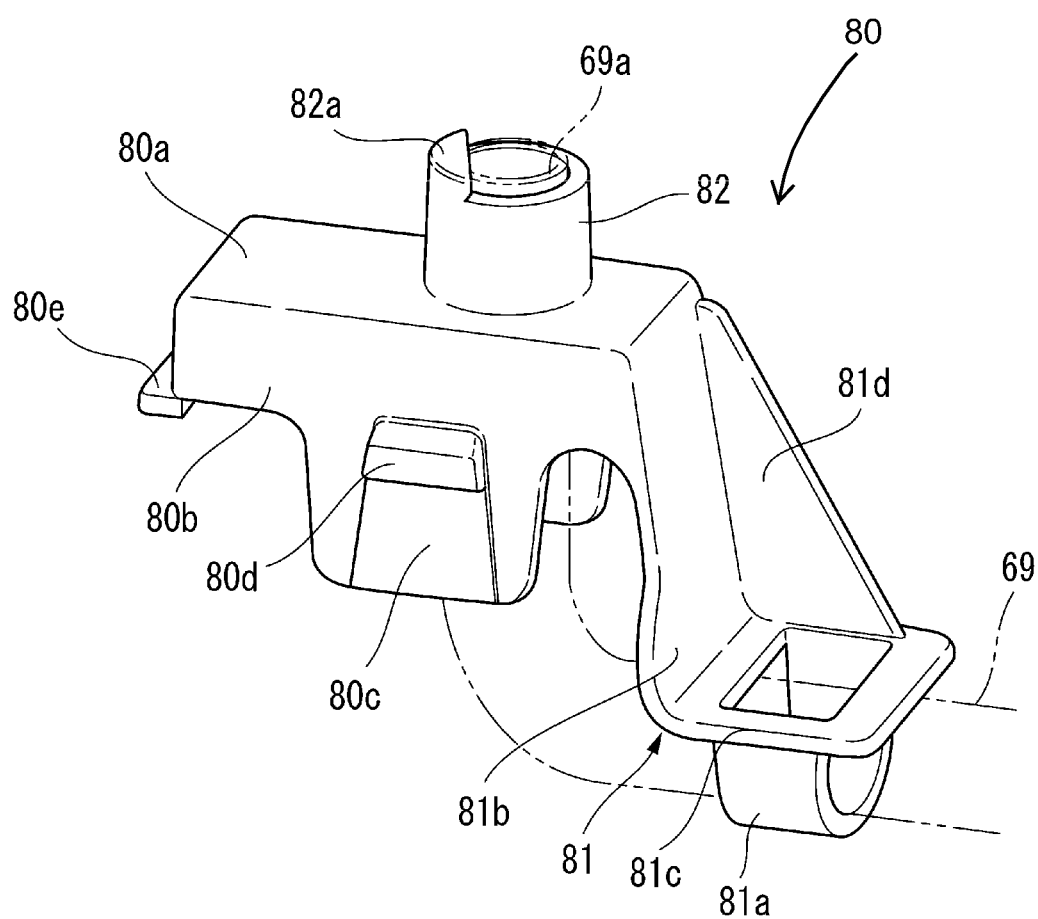
FIG. 8 is a perspective view of the locking member according to the present invention.
Figure 9:
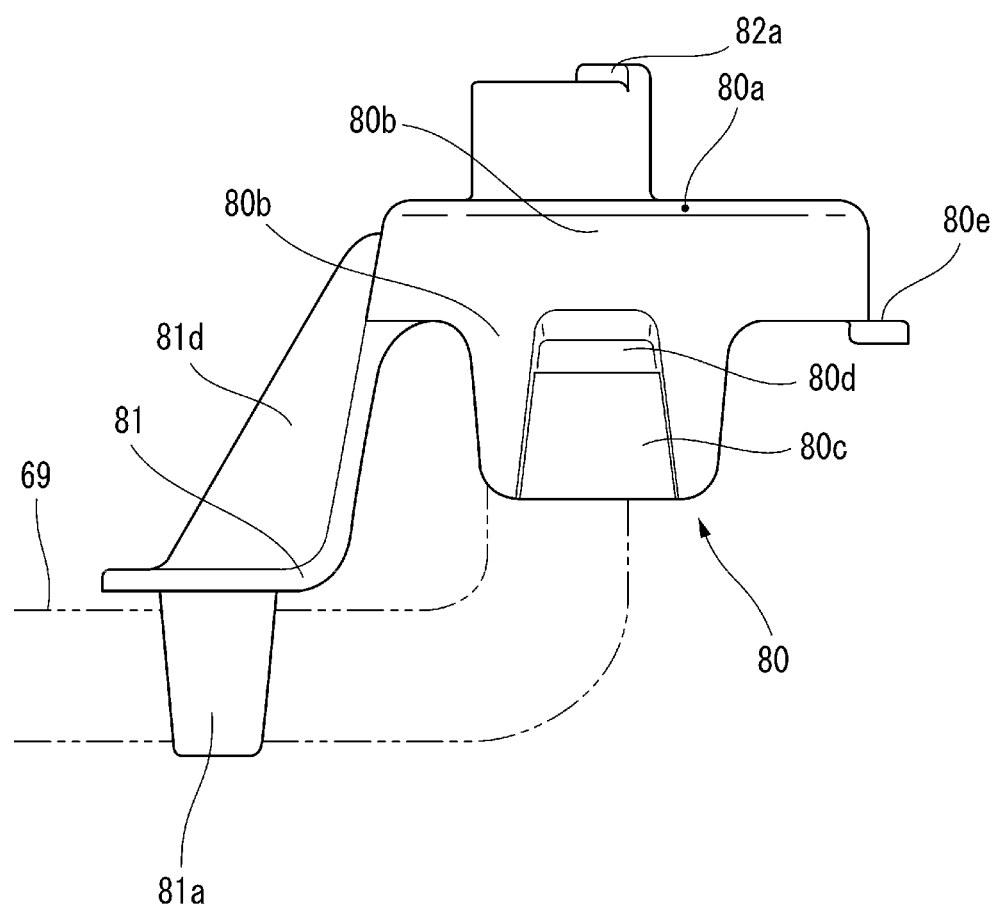
FIG. 9 is a left side view of the locking member shown in FIG. 7.
Figure 10:
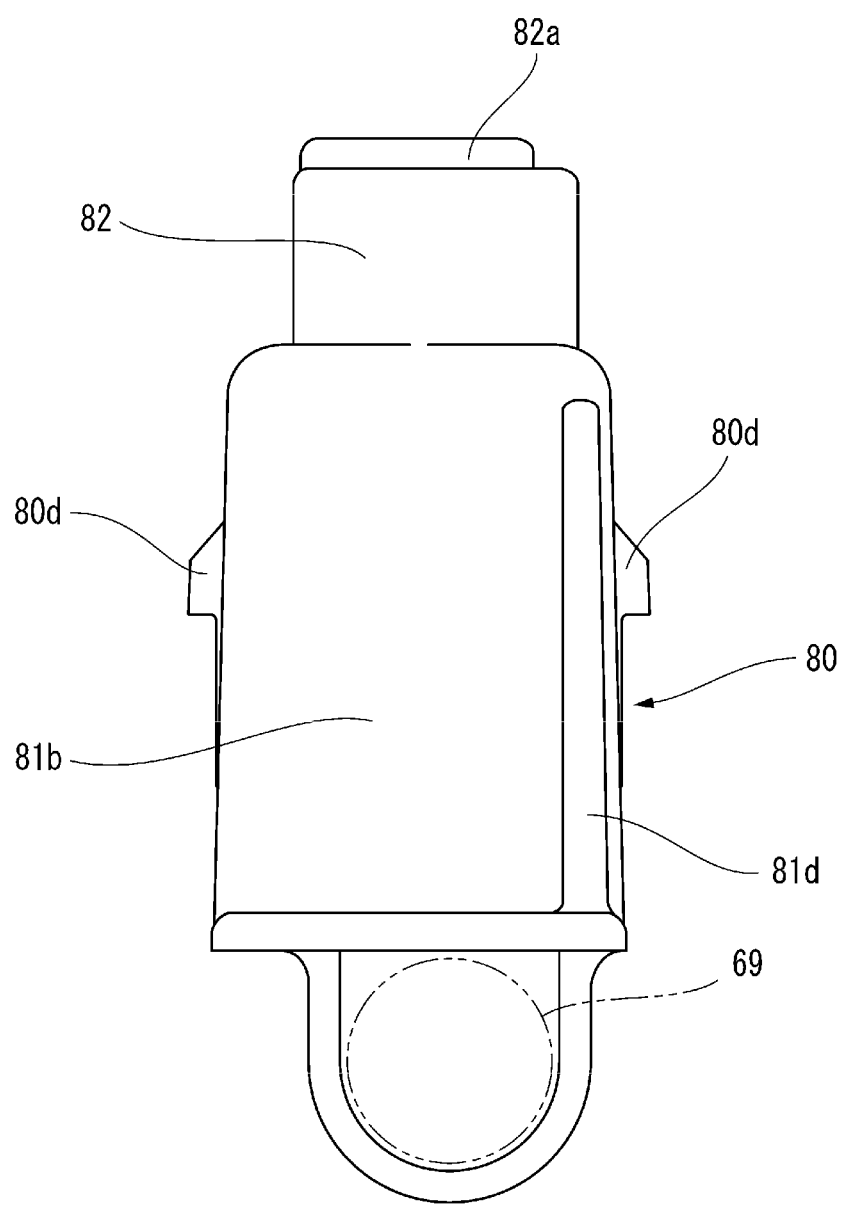
FIG. 10 is a front view of the locking member shown in FIG. 7.

The locking member 80 in the present embodiment as shown in FIG. 8, FIG. 9, and FIG. 10 includes a plate-shaped upper portion 80a for placement opposite to the ceiling surface 70a of the recessed portion 70, and a sidewall portion 80b that extends downwardly from the edge portion of the plate-shaped portion 80a along the recessed portion sidewall 70b of the recessed portion 70. Furthermore the locking pawl 80d, provided extending outwardly on each sidewall portion 80b (FIG. 10) is configured to engage with the hollow opening 70c provided in the recessed portion 70 for receiving the pawl.

Although there is no particular limitation on the material used in the locking member 80, an integrated structure using synthetic plastic resin or hardened rubber, or the like is suitable.

The locking member 80 includes a sidewall extension portion 80c that is integrated with the sidewall portion 80b, a pipe-supporting portion 81 that supports the vent pipe 69 with a locking portion introduction portion, and an upper cylindrical portion 82 that protrudes from the plate-shaped upper portion 80a towards the ceiling surface 70a of the recessed portion 70, is fitted with the distal end portion 69a of the vent pipe 69, and the locking member 80 is provided with a positioning pawl 82a that positions and locks the vent pipe 69. The positioning pawl 82a effectively functions as a stop member to limit upward movement of the vent pipe 69 in the cylindrical portion 82 of the locking member 80.

Furthermore the pipe-supporting portion 81 is configured so that a gripping sleeve portion 81a is provided on a protruding wall 81b, 81d that extends considerably in the same direction as the sidewall extending portion 80c. The positioning pawl 82a is formed to slightly protrude from the upper edge of the cylindrical portion 82 into the cylinder thereof, as shown. Furthermore a locking flange 80e is formed on an outer end of the locking member 80 opposite to the pipe-supporting portion 81, and this locking flange provides a locking member guiding portion for use in aligning the locking member in the recessed portion of the carrier plate 77.

According to this type of structure, the vent pipe 69 can be retained slightly tightly by inserting the vent pipe through the gripping sleeve portion 81a of the pipe-supporting portion 81, and furthermore the distal end of the vent pipe 69 is retained by the cylindrical portion 82, and the distal end portion 80a abuts on the positioning pawl 82a. In this manner, the distal end position of the vent pipe 69 can be securely mounted in place.

According to this type of configuration, during mounting operations, for example, the locking member 80 (when the vent pipe 69 is mounted) is pressed upwardly in the direction of the arrow A as shown in FIG. 12 from below the carrier plate 77. At this time, the sidewall portion 80b is slightly bent, the locking pawl 80d is pressed into the engagement hole 70d provided on the recessed portion sidewall 70b, and the locking flange 80e abuts on the distal end of the recessed portion sidewall 70b, to thereby complete the mounting operation.

This type of simple structure enables a simple mounting operation by merely pressing the locking member 80 into the recessed portion 70.

According to the structure of the present embodiment, the rear surface of the carrier plate 77 can be mounted using a slightly modified structure in a conventional vehicle body structure, and enables an effective water prevention structure without provision of a designated mounting portion.

The inner portion state when assembling the locking member 80 is shown in FIG. 13.

The vent pipe 69 is positioned by fitting the distal end portion 69a thereof into the upper cylindrical portion 82 of the locking member 80, and is connected and firmly retained in the pipe-supporting sleeve portion 81a.

In the state as shown in FIG. 13, when the all-terrain vehicle is operating in water, even when the water surface rises, air is retained in the recessed portion 70, and therefore rapid entry of water into the vent pipe 69 is suppressed.

Furthermore, since even when air is drawn into the vent pipe 69, the space portion 75 creates flow resistance. Therefore water entry can be suppressed. Since the vent pipe 69 extends and is supported upwardly, the height to the opening 69a of the vent pipe 69 in the recessed portion 70 can be maintained, and water entry into the vent pipe can be suppressed.

In the present embodiment, the canister 64 and the locking member 80 are positioned in close contact. In this manner, the vent pipe 69 can be made short. Furthermore, the space portion 75 is disposed at a position that overlaps rearwardly with respect to the canister 64 when the vehicle is viewed from the front (refer also to FIG. 7). This type of configuration suppresses entry of water into the space 75, since the canister plays a water-isolating role during operation in water.

In the present embodiment, the position of the carrier plate 77 is configured so that the carrier upper surface is positioned above the rearward extension line or on the rearward extension line (SL) of the riding seat 17. When provided at this height, the state in which the water level rises up to the height of the riding seat 17 is the water level region that causes an alert for a passenger. Furthermore the frequency with which the water level rises to the opening 69c of the vent pipe 69 provided on a lower portion of the carrier plate 77 can be reduced.

Although an illustrative embodiment of the present invention has been described above, the present invention is not limited in any manner to the configuration of the above embodiment, and various modifications may be included. For example, rather than the recessed portion 70 being configured by use of the carrier plate 77, a configuration using another vehicle body cover, or a configuration in which a separate designated member is provided may be used. Furthermore, the locking member 80 may be suitably modified as required in relation to shape of the locking structure.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle comprising:
    a vehicle body frame for supporting a vehicle body thereon;
    a fuel tank mounted on the vehicle body frame;
    a canister for temporarily storing vaporized fuel from the fuel tank;
    a charge pipe that connects the fuel tank to the canister, and that introduces vaporized fuel from the fuel tank to the canister;
    a purge pipe that operatively connects the canister with an intake system of an internal combustion engine;
    a vent pipe that connects the canister with ambient air outside of the canister; and
    a vent pipe retaining member which is operatively attached to the vehicle body;
    wherein an opening of the vent pipe is configured to open upwardly with respect to the vehicle body in a recessed portion of the vent pipe retaining member, where said recessed portion is formed in a hollow shape, and which has an opening formed therein which is oriented downwardly in the vehicle, for selectively trapping air therein, and
    wherein a partially open space is formed in an interval leading to a recessed portion sidewall of the vent pipe retaining member at the recessed portion thereof, and further comprising a locking member for covering the opening of the recessed portion from below, and
    the locking member comprises
        an upper plate-shaped portion that is opposed to a ceiling surface of the recessed portion;
        a sidewall portion that extends downwardly from an edge portion of the upper plate-shaped portion and is disposed abutting the sidewall of the recessed portion;
        and a locking pawl that is provided on the sidewall portion and that engages with an opening provided in the recessed portion, the sidewall extension portion integrally formed with the sidewall portion;
        a pipe-supporting sleeve portion that supports the vent pipe therein;
        a locking member guiding portion; and
        a cylindrical portion that protrudes upwardly from the upper plate-shaped portion towards the ceiling surface of the recessed portion, that is fitted with a distal portion of the vent pipe, and that includes a stop member for limiting upward movement of the vent pipe.

2. The vehicle according to claim 1, wherein the vent pipe retaining member comprises a substantially grid-shaped carrier plate, wherein the recessed portion is configured such that a horizontal wall of a rear portion of the carrier plate functions as the ceiling surface, wherein reinforcing ribs of the carrier plate function as the recessed portion sidewall, and wherein the locking member is fitted into and locked to the recessed portion.

3. The vehicle according to claim 1, wherein the partially open space is disposed in a position that overlaps rearwardly with respect to the canister when the vehicle is viewed from the front.

4. The vehicle according to claim 2, wherein a position of the carrier plate is configured so that an upper surface thereof is positioned on or above a rearward extension line of a riding seat.

5. The evaporative emissions system for a vehicle according to claim 1, wherein when the evaporative emissions system is installed on a vehicle, the partially open space is disposed in a position that overlaps rearwardly with respect to the canister when the vehicle is viewed from the front.

6. An evaporative emissions system for a vehicle, comprising:
    a fuel tank for mounting on a body frame of the vehicle;
    a canister for temporarily storing vaporized fuel from the fuel tank;
    a charge pipe that connects the fuel tank to the canister, and that introduces vaporized fuel from the fuel tank to the canister;
    a purge pipe that operatively connects the canister with an intake system of an internal combustion engine;
    a vent pipe that connects the canister with ambient air outside of the canister; and
    a vent pipe retaining member for attachment to the body frame, said vent pipe retaining member comprising a carrier frame and a locking member which is removably engageable with the carrier frame;

wherein an opening of the vent pipe is configured to open upwardly in a recessed portion of the vent pipe retaining member, wherein said recessed portion is formed in a hollow shape and has an opening formed therein which is oriented downwardly in the vehicle, for selectively trapping air therein, wherein a partially open space is formed in an interval leading to a recessed portion sidewall of the vent pipe retaining member at the recessed portion thereof, wherein the locking member covers the recessed portion from an area below the carrier frame when installed therein, and wherein the locking member comprises an upper plate-shaped portion that is opposed to a ceiling surface of the recessed portion;

a sidewall portion that extends downwardly from an edge portion of the upper plate-shaped portion and is disposed abutting the sidewall of the recessed portion;

a sidewall extension portion integrally formed with the sidewall portion;

a locking pawl that is provided on the sidewall portion and that engages with an opening provided in the recessed portion;

a pipe-supporting sleeve portion that supports the vent pipe therein;

a locking member guiding portion;

a cylindrical portion that protrudes upwardly from the upper plate-shaped portion towards the ceiling surface of the recessed portion, that is fitted with a distal portion of the vent pipe, and that includes a stop member for limiting upward movement of the vent pipe.

7. The evaporative emissions system for a vehicle according to claim 6, wherein the carrier plate is substantially grid-shaped, wherein the recessed portion is configured such that a horizontal wall of a rear portion of the carrier plate functions as the ceiling surface, wherein reinforcing ribs of the carrier plate function as the recessed portion sidewall, and wherein the locking member is fitted in and locked into the recessed portion.

8. The evaporative emissions system for a vehicle according to claim 6, wherein when the evaporative emissions system is installed on a vehicle, the partially open space is disposed in a position that overlaps rearwardly with respect to the canister when the vehicle is viewed from the front.

9. A vehicle comprising:
a vehicle body frame for supporting a vehicle body thereon;
a fuel tank mounted on the vehicle body frame;
a canister for temporarily storing vaporized fuel from the fuel tank;
a charge pipe that connects the fuel tank to the canister, and that introduces vaporized fuel from the fuel tank to the canister;
a purge pipe that operatively connects the canister with an intake system of an internal combustion engine;
a vent pipe that connects the canister with ambient air outside of the canister;
a vent pipe retaining member which is operatively attached to the vehicle body;

wherein an opening of the vent pipe is configured to open upwardly with respect to the vehicle body in a recessed portion of the vent pipe retaining member, where said recessed portion is formed in a hollow shape, and which has an opening formed therein which is oriented downwardly in the vehicle, for selectively trapping air therein;

wherein the recessed portion is configured such that a horizontal wall of a rear portion of the carrier plate functions as the ceiling surface;

wherein the vent pipe retaining member comprises a substantially grid-shaped carrier plate;

wherein reinforcing ribs of the carrier plate function as the recessed portion sidewall, and wherein the locking member is fitted into and locked to the recessed portion;

wherein a partially open space is formed in an interval leading to a recessed portion sidewall of the vent pipe retaining member at the recessed portion thereof and further comprising a locking member for covering the opening of the recessed portion from below;

wherein the locking member comprises:

an upper plate-shaped portion that is opposed to a ceiling surface of the recessed portion;

a sidewall portion that extends downwardly from an edge portion of the upper plate-shaped portion and is disposed abutting the sidewall of the recessed portion; and a locking pawl that is provided on the sidewall portion and that engages with an opening provided in the recessed portion, the sidewall extension portion integrally formed with the sidewall portion;

a pipe-supporting sleeve portion that supports the vent pipe therein;

a locking member guiding portion; and a cylindrical portion that protrudes upwardly from the upper plate-shaped portion towards the ceiling surface of the recessed portion, that is fitted with a distal portion of the vent pipe, and that includes a stop member for limiting upward movement of the vent pipe.

10. The vehicle according to claim 9, wherein the partially open space is disposed in a position that overlaps rearwardly with respect to the canister when the vehicle is viewed from the front.

* * * * *